(12) United States Patent
Chen

(10) Patent No.: US 10,555,288 B2
(45) Date of Patent: Feb. 4, 2020

(54) METHOD AND APPARATUS FOR ASSISTING DATA TRANSMISSION IN A WIRELESS COMMUNICATION SYSTEM

(71) Applicant: ASUSTeK Computer Inc., Taipei (TW)

(72) Inventor: Wei-Yu Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/454,644

(22) Filed: Mar. 9, 2017

(65) Prior Publication Data

US 2017/0265183 A1    Sep. 14, 2017

Related U.S. Application Data

(60) Provisional application No. 62/307,117, filed on Mar. 11, 2016.

(51) Int. Cl.
*H04W 72/04* (2009.01)
*H04W 52/36* (2009.01)
(Continued)

(52) U.S. Cl.
CPC ..... *H04W 72/0413* (2013.01); *H04W 52/365* (2013.01); *H04W 72/0446* (2013.01); *H04W 72/10* (2013.01); *H04W 88/08* (2013.01)

(58) Field of Classification Search
CPC ........... H04W 52/365; H04W 72/0413; H04W 72/0446; H04W 72/10; H04W 72/1242;
(Continued)

(56) References Cited

U.S. PATENT DOCUMENTS

2009/0046639 A1* 2/2009 Cai ................. H04L 47/625
370/329
2009/0316626 A1* 12/2009 Lee ................. H04L 1/1607
370/328

(Continued)

FOREIGN PATENT DOCUMENTS

EP     2343945     7/2011
EP     2509373     10/2012

OTHER PUBLICATIONS

3GPP TSG-RAN WG2 #64, Nov. 10-14, 2008, Prague, Czech (R2-086092).

(Continued)

*Primary Examiner* — Kashif Siddiqui
(74) *Attorney, Agent, or Firm* — Blue Capital Law Firm P.C.

(57) ABSTRACT

A method and apparatus are disclosed for assisting data transmission in a wireless communication system. In one embodiment, the method includes the UE establishing at least three logical channels which includes at least a first logical channel, a second logical channel, and a third logical channel. The method further includes the UE being configured with periodic uplink resource by a base station, wherein the periodic uplink resource is shared by the first logical channel and the second logical channel, but is not shared by the third logical channel. The method also includes the UE performing a first transmission via the periodic uplink resource, wherein the first transmission includes data associated with the first logical channel and/or data associated with the second logical channel.

20 Claims, 23 Drawing Sheets

(51) Int. Cl.
*H04W 72/10* (2009.01)
*H04W 88/08* (2009.01)

(58) Field of Classification Search
CPC ......... H04W 72/1268; H04W 72/1284; H04W 88/08
See application file for complete search history.

(56) References Cited

U.S. PATENT DOCUMENTS

| | | | |
|---|---|---|---|
| 2011/0170495 A1* | 7/2011 | Earnshaw | H04W 72/02 370/329 |
| 2012/0057547 A1* | 3/2012 | Lohr | H04L 5/0007 370/329 |
| 2012/0069805 A1 | 3/2012 | Feuersanger | |
| 2014/0169253 A1* | 6/2014 | Chun | H04W 72/005 370/312 |
| 2015/0087298 A1* | 3/2015 | Li | H04L 67/325 455/426.1 |
| 2015/0334734 A1* | 11/2015 | Park | H04W 76/15 370/329 |
| 2015/0373689 A1 | 12/2015 | Tabet | |
| 2016/0080130 A1 | 3/2016 | Tiirola | |
| 2018/0027419 A1* | 1/2018 | Xu | H04W 16/14 455/454 |

OTHER PUBLICATIONS

European Search Report from corresponding EP Patent Application No. 17160149.5, dated Aug. 18, 2017.
Communication pursuant to Article 94(3) EPC in corresponding EP Application No. 17160149.5, dated Apr. 2, 2019.

* cited by examiner

| Sample use case | Description | Critical Requirements |
|---|---|---|
| Substation protection and control | • Automates fault detection and isolation to prevent large scale power outage<br>• For example, Merging Units (Mus) perform periodic measurements of power system components, and send sampled measurement data to a Protection Relay. When the Protection Relay detects a fault, it sends signals to trip circuit breakers. | • Latency: as low as 1 ms end-to-end<br>• Packet loss rate: as low as 1e-04<br>• Transmission frequency: 80 samples/cycle for protection applications. 256 samples/cycle for quality analysis & recording<br>• Data rate: ~12.5Mbps per MU at 256 samples/cycle<br>• Range: provide coverage to the substation |
| Smart grid system with distributed sensors and management | • A smart grid system aims at improving the efficiency of energy distribution and requires prompt reaction in reconfiguring the smart grid network in response to unforeseen events. | Performance requirements are derived from EC FP7 project METIS Deliverable D.1.1:<br>• Throughput: from 200 to 1521 bytes reliably delivered in 8 ms,<br>• One trip time latency between any two communicating points should be less than 8 ms for event-triggered message that may occur anytime.<br>• Device density: dense urban hundreds of UEs per square km; urban: around 15 UEs per square km; populated rural: max 1 UE per squared km. |
| Public Safety | • Operation of first responders in case of fire or other kind of emergency situation. | Public Safety requires preferential handling of its traffic. |

FIG. 6 (PRIOR ART)

METHOD AND APPARATUS FOR ASSISTING DATA TRANSMISSION IN A WIRELESS COMMUNICATION SYSTEM

CROSS-REFERENCE TO RELATED APPLICATIONS

The present Application claims the benefit of U.S. Provisional Patent Application Ser. No. 62/307,117 filed on Mar. 11, 2016, the entire disclosure of which is incorporated herein in their entirety by reference.

FIELD

This disclosure generally relates to wireless communication networks, and more particularly, to a method and apparatus for assisting data transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed for assisting data transmission in a wireless communication system. In one embodiment, the method includes the UE (User Equipment) establishing at least three logical channels which includes at least a first logical channel, a second logical channel, and a third logical channel. The method further includes the UE being configured with periodic uplink resource by a base station, wherein the periodic uplink resource is shared by the first logical channel and the second logical channel, but is not shared by the third logical channel. The method also includes the UE performing a first transmission via the periodic uplink resource, wherein the first transmission includes data associated with the first logical channel and/or data associated with the second logical channel.

BRIEF DESCRIPTION OF THE DRAWINGS

FIG. 6 is a reproduction of Table 5.1.6 of 3GPP TR 22.891 v1.2.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: SP-150142, "New WID Study on New Services and Markets Technology Enablers (FS_SMARTER)"; TR 22.891 v1.2.0, "Feasibility Study on New Services and Markets Technology Enablers; Stage 1 (Release 14)"; SP-150818, "New WID on Study on SMARTER Critical Communications (FS_SMARTER- CRIC)"; S1-154453, "Feasibility Study on New Services and Markets Technology Enablers Critical Communications; Stage 1 (Release 14)"; "Requirements and Current Solutions of Wireless Communication in Industrial Automation", A. Frotzscher et al., IEEE ICC'14-W8: Workshop on 5G Technologies, 2014; TS 36.321 v13.0.0, "E-UTRA MAC protocol specification"; TS 36.331 v13.0.0. "E-UTRA RRC protocol specification"; and TS 23.401 v13.4.0, "GPRS enhancements for E-UTRAN access". The standards and documents listed above are hereby expressly incorporated by reference in their entirety.

Figure 1:
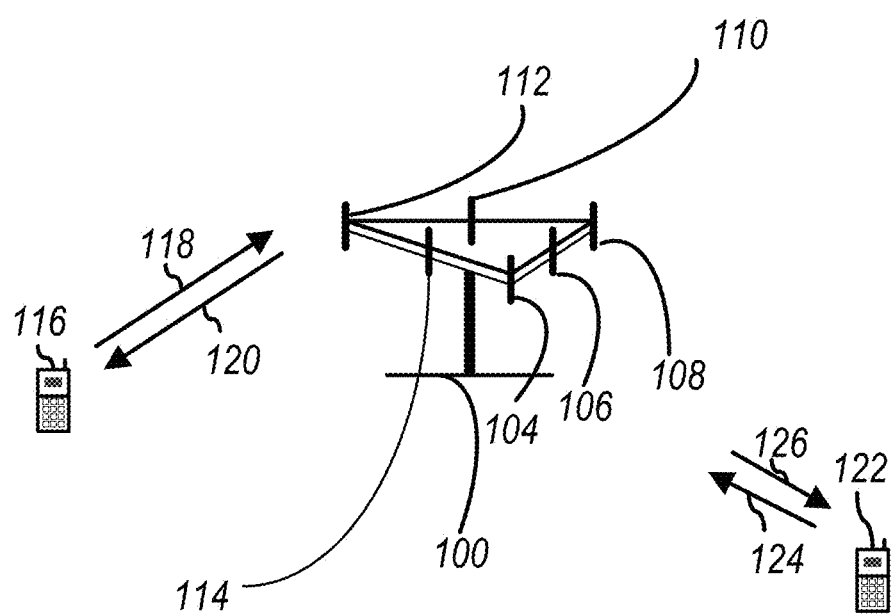
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
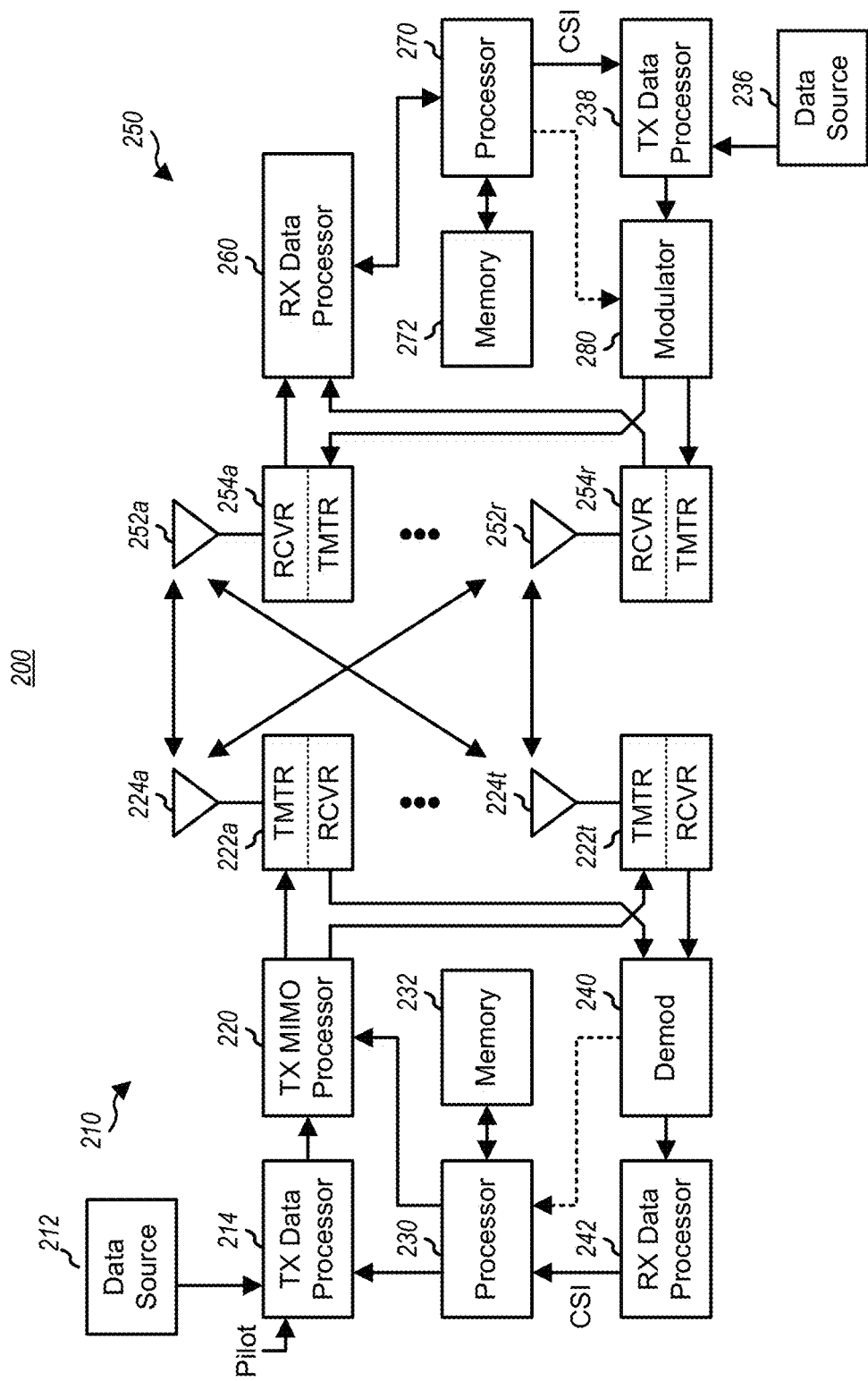
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
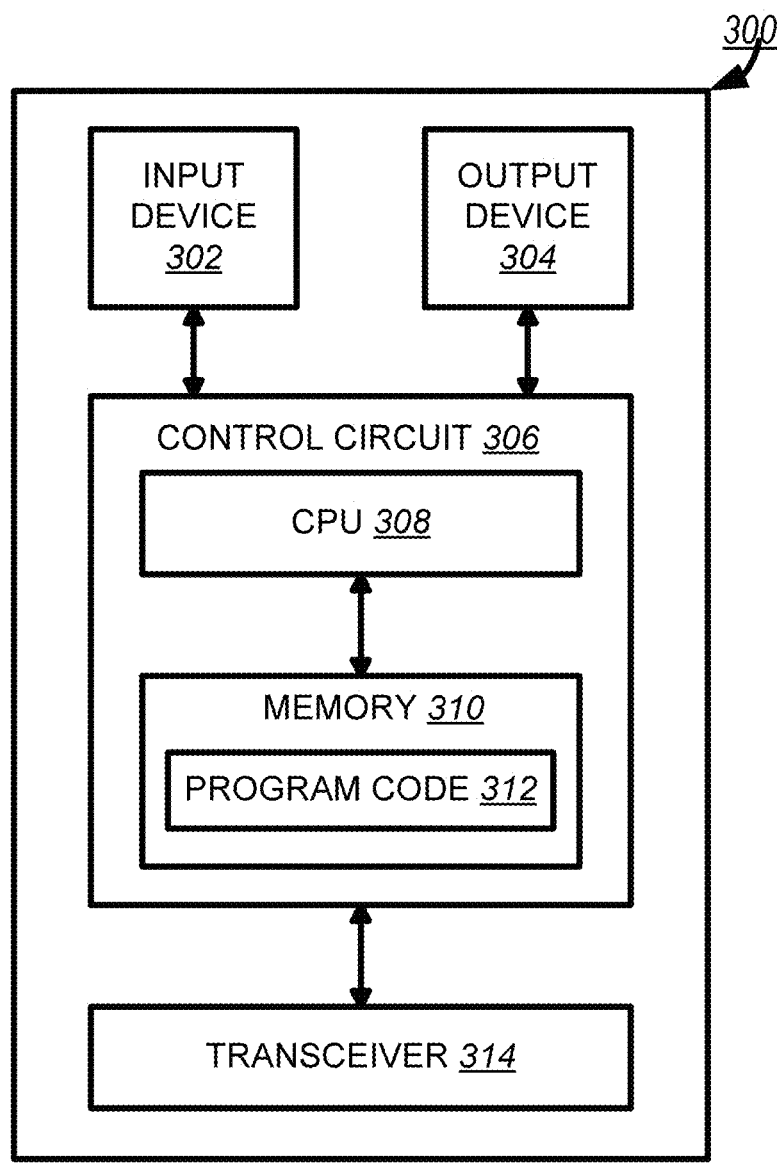
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
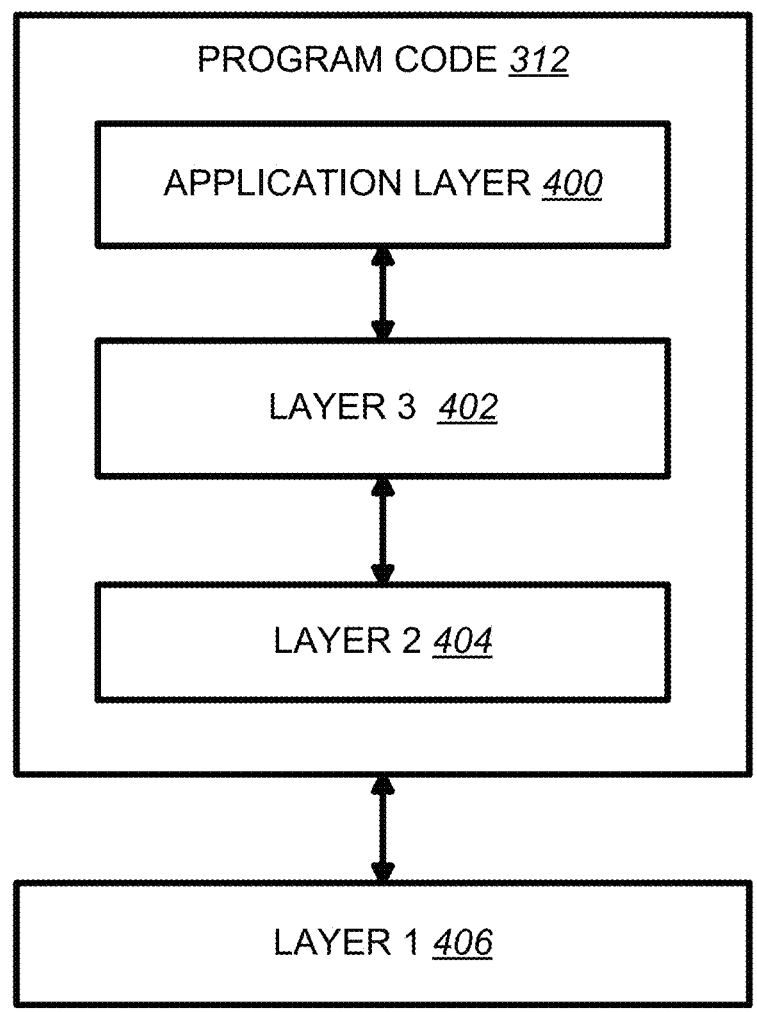
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

Study on next generation mobile communication system has been in progress in 3GPP. In 3GPP SA, high-level use cases and the related high-level potential requirements are identified to enable 3GPP network operators to support the needs of new services and markets as discussed in 3GPP SP-150142. The outcome of the study is documented in 3GPP TR 22.891. During the study, critical communication has been identified as one important area where the 3GPP system needs to be enhanced as discussed in 3GPP SP-150818. The identified use case families in the area of critical communication include:

Higher reliability and lower latency
Higher reliability, higher availability and lower latency
Very low latency
Higher accuracy positioning In the family of higher reliability and lower latency, factory automation is one of the use cases discussed in 3GPP S1-154453 as follows:

Factory automation requires communications for closed-loop control applications. Examples for such applications are robot manufacturing, round-table production, machine tools, packaging and printing machines. In these applications, a controller interacts with large number of sensors and actuators (up to 300), typically confined to a rather small manufacturing unit (e.g., 10 m×10 m×3 m). The resulting sensor/actuator density is often very high (up to $1/m^3$). Many of such manufacturing units may have to be supported within close proximity within a factory (e.g., up to 100 in assembly line production, car industry).

In the closed-loop control application, the controller periodically submits instructions on to a set of sensor/actuator devices, which return a response within a cycle time. The messages, referred to as telegrams, typically have small size (<50 bytes). The cycle time ranges between 2 and 20 ms setting stringent latency constraints on to telegram forwarding (<1 ms to 10 ms). Additional constraints on isochronous telegram delivery add tight constraints on jitter (10-100 us). Transport is also subject to stringent reliability requirements measured by the fraction of events where the cycle time could not be met ($<10^{-9}$). In addition, sensor/actuator power consumption is often critical.

Traditionally closed-loop control applications rely on wired connections using proprietary or standardized field bus technologies. Often, sliding contacts or inductive mechanisms are used to interconnect to moving sensor/actuator devices (robot arms, printer heads, etc.). Further, the high spatial density of sensors poses challenges to wiring.

WSAN-FA, which has been derived from ABB's proprietary WISA technology and builds on top of 802.15.1 (Bluetooth), is a wireless air interface specification that is targeted at this use case. WSAN-FA claims to reliably meet latency targets below 10-15 ms with a residual error rate of <10-9. WSAN-FA uses the unlicensed ISM 2.4 band and is therefore vulnerable to in-band interference from other unlicensed technologies (WiFi, ZigBee, etc.).

To meet the stringent requirements of closed-loop factory automation, the following considerations may have to be taken:

Limitation to short range communications between controller and sensors/actuators.
Allocation of licensed spectrum for closed-loop control operations. Licensed spectrum may further be used as a complement to unlicensed spectrum, e.g., to enhance reliability.
Reservation of dedicated air-interface resources for each link.
Combining of multiple diversity techniques to approach the high reliability target within stringent latency constraints such as frequency, antenna, and various forms of spatial diversity, e.g., via relaying
Utilizing OTA time synchronization to satisfy jitter constraints for isochronous operation.
Network access security used in an industrial factory deployment is provided and managed by the factory owner with its ID management, authentication, confidentiality and integrity.

A typical industrial closed-loop control application is based on individual control events. Each closed-loop control event consists of a downlink transaction followed by an synchronous uplink transaction both of which are executed within a cycle time, Tcycle. Control events within a manufacturing unit may have to occur isochronously.

1. Controller requests from sensor to take a measurement (or from actuator to conduct actuation).
2. Sensor sends measurement information (or acknowledges actuation) to controller.

Figure 5:
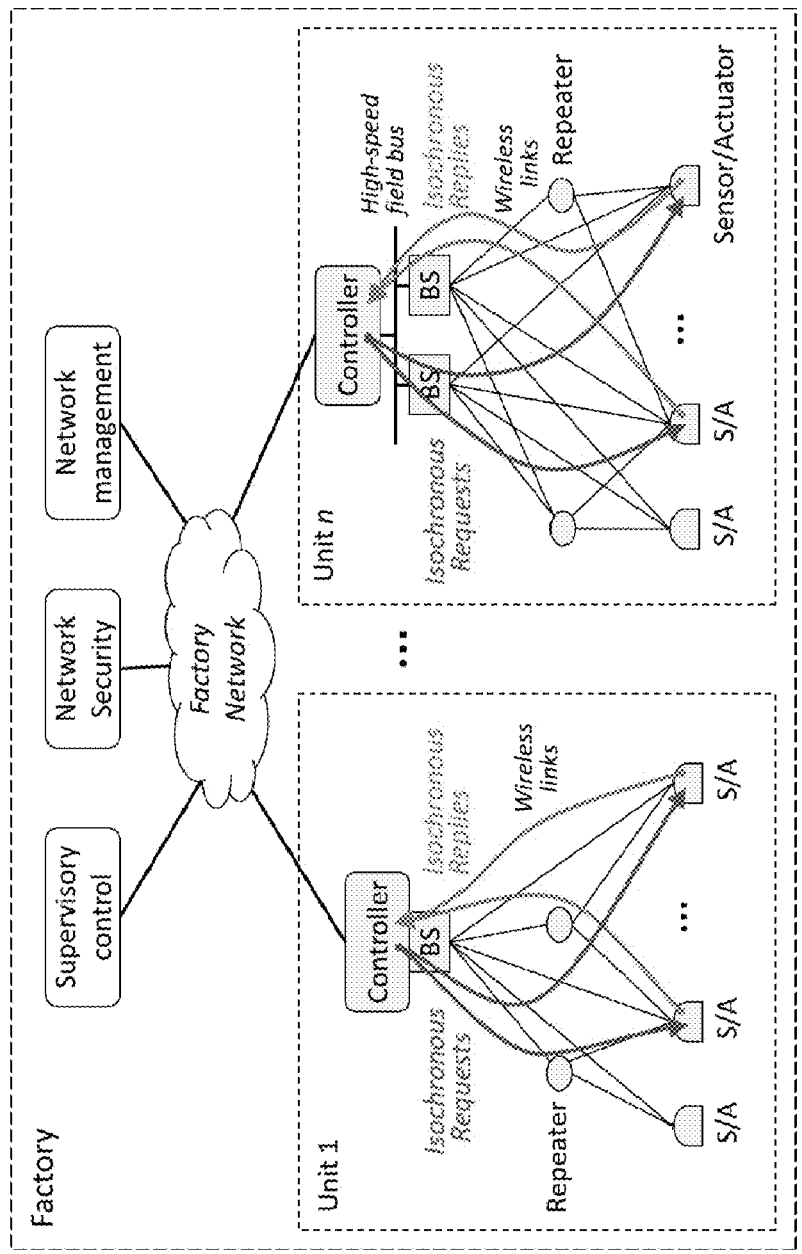
FIG. 5 is a reproduction of Figure 5.1.2.1.1 of 3GPP S1-154453.

Figure 5.1.2.1.1 of 3GPP S1-154453 is Reproduced as FIG. 5

Figure 5.1.2.1.1 depicts how communication will occur in factory automation. In this use case, communication is confined to local controller-to-sensor/actuator interaction within each manufacturing unit. Repeaters may provide spatial diversity to enhance reliability.

The ultra-reliable communication is one of outcomes of the study is documented in 3GPP TR 22.891. In this use case, 3GPP TR 22.891 describes what kinds of services may have critical information communication and potentially need to be supported by ultra-reliable communication. In addition, 3GPP TR 22.891 mentions that the requirements for supporting different mission critical services could be different. In particular, TR 22.891 provides the following description:

5.1.1 Description

In order to enable certain services related to ultra-highly reliable communications, a minimal level of reliability and latency is required to guarantee the user experience and/or enable the service initially. This is especially important in areas like eHealth or for critical infrastructure communications.

Mission critical communication services require preferential handling compared to normal telecommunication services, e.g. in support of police or fire brigade.

Examples of mission critical services include:

Industrial control systems (from sensor to actuator, very low latency for some applications)

Mobile Health Care, remote monitoring, diagnosis and treatment (high rates and availability)

Real time control of vehicles, road traffic, accident prevention (location, vector, context, low Round Trip Time RTT)

Wide area monitoring and control systems for smart grids

Communication of a critical information with preferential handling for public safety scenarios Multimedia Priority Service (MPS) providing priority communications to authorized users for national security and emergency preparedness Overall, mission critical services are expected to require significant improvements in end-to-end latency, ubiquity, security, robustness, and availability/reliability compared to UMTS/LTE/WiFi.

5.1.1.1 Pre-conditions

The different substations of a power system are connected to operator A's network to provide automated measurements and automated fault detection to prevent large scale outage.

5.1.1.2 Service Flows

1. Substations connect to the operator A network
2. Operator A determines this is a mission critical device and configures the network based on the mission critical service requirements
3. Substations report periodic measurements with a given reliability and latency
4. In case of a fault or degraded operation—substation reports fault or degraded operation with a second reliability and latency
5. In the case of a power grid, the power system reacts and may shutdown or divert power from this substation or other substations in the vicinity

5.1.1.3 Post-conditions

The power system can optimize performance due to periodic measurements. A potential disaster is averted due to the substation reporting in time.

5.1.2 Potential Service Requirements

Services in this category require very low data error rate. Some of them also require very low latency, i.e. for industrial automation with delays of one ms.

5.1.3 Potential Operational Requirements

The 3GPP system shall support efficient multiplexing of mission critical traffic and nominal traffic.

The 3GPP system shall limit the duration of service interruption for mission critical traffic.

The 3GPP system shall support improved reliability and latency as defined in table 5.1.6.

Subject to regional regulatory requirements, the 3GPP system shall support a mechanism to provide end-to-end integrity and confidentiality protection for user data, The 3GPP system shall provide significant improvements in end-to-end latency, ubiquity, security, and availability/reliability compared to UMTS/EPS/WiFi.

Table 5.1.6 of 3GPP TR 22.891 v1.2.0, Entitled "Example Mission Critical Use Cases", is Reproduced as FIG. 6

Figure 7:
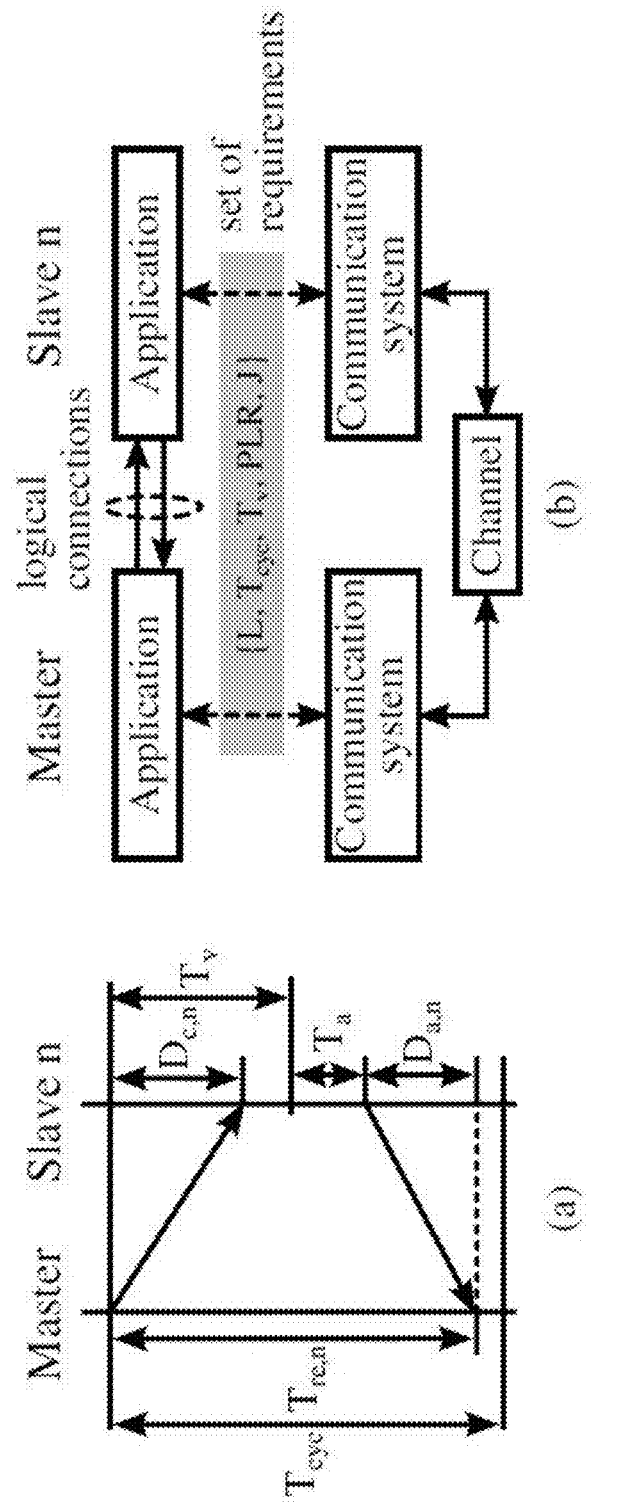
FIG. 7 is a reproduction of FIG. 2 of the IEEE paper entitled "Requirements and Current Solutions of Wireless Communication in Industrial Automation" by A. Frotzscher et al.

The article entitled "Requirements and Current Solutions of Wireless Communication in Industrial Automation" by A. Frotzscher et al. provideds a clearer view for closed loop control in factory automation. Based on the contents the article, the model of instruction-response cycle for closed loop control is clearly defined in FIG. 7 which is a reproduction of FIG. 2 of the article.

In order to fulfill cycle time limitation, delaying the responses due to any data/signaling with priority higher than the responses should be considered and prevented. In addition, necessary information from factory network to base station (BS) to help BS properly configures the UE(s) and provides radio resources to UE(s) to support periodic instruction should be considered. Any necessary information from BS to factory network should also be considered. The information would at least express cycle time limitation and would also help BS decides which UE(s) belongs to the same group with the same group identity.

In particular, the solutions should at least take care of the following considerations:

For downlink direction, same instruction is transmitted to a set of UEs.

For downlink direction, the set of UEs shall start the DL reception isochronously.

For uplink direction, the content of each UE's response can be different.

For uplink direction, UL transmission of each UE may or may not be at the same time.

In detail, to schedule the periodic transmission and response, LTE semi-persistent scheduling (SPS) can be considered. However, using LTE SPS has the following drawbacks:

LTE SPS is per-UE scheduling. To schedule the same instruction transmission to the set of UEs, eNB (evolved Node B) needs to indicate SPS activation via PDCCH (Physical Downlink Control Channel) individually to every UE in the set. Large number of UEs in the set could have negative impact to scheduling complexity and PDCCH capacity.

Figure 8:
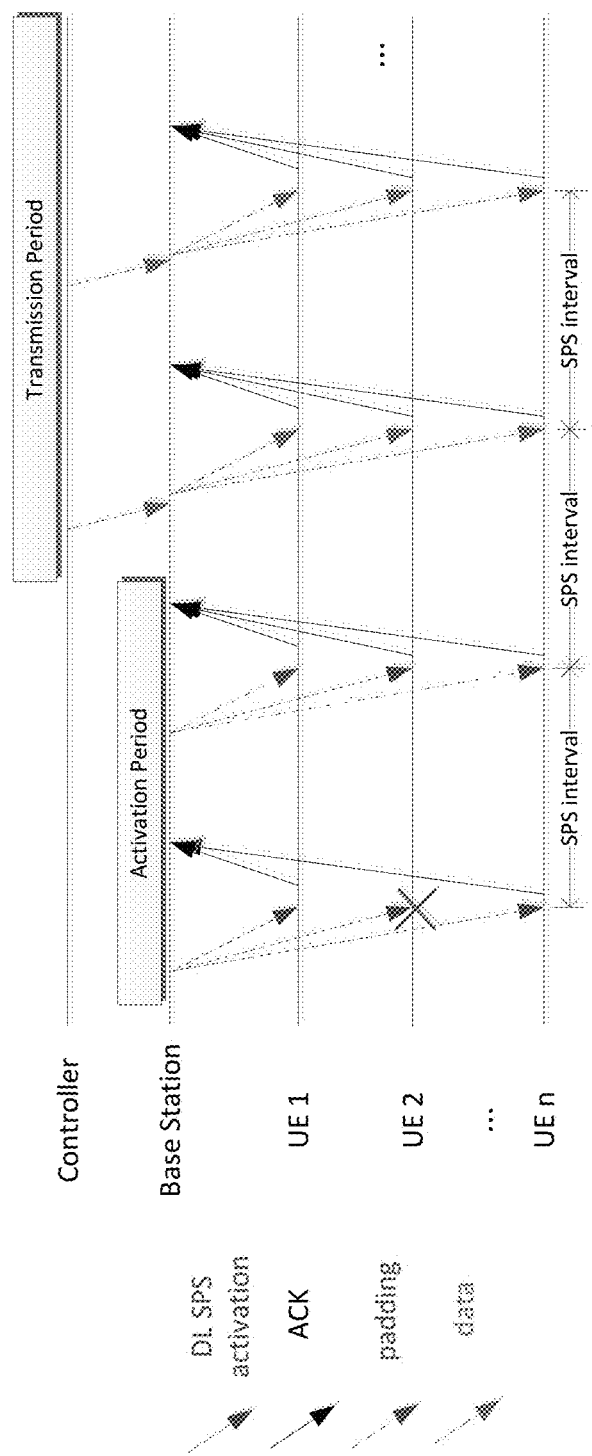
FIG. 8 is a diagram according to one exemplary embodiment.

If the same instruction is to be transmitted to the set of UEs, all UEs in the set need to start the DL (Downlink) reception at the same time in order to receive the same instruction. To ensure every UE has received the SPS activation successfully, a period of time before transmitting instruction (e.g., activation period) is necessary for base station to activate SPS for every UE in the set so that the UE losing the SPS activation signaling can still have time to recover (due to loss rate of lower layer signaling). Besides, in order to align the time of SPS occasion between UEs, SPS activation cannot be retransmitted freely but on the start of every SPS interval, which is an additional restriction for LTE SPS. Extra UE power waste is caused due to earlier SPS activation (wait for other UE to be ready). FIG. 8 illustrates an example of LTE SPS activation according to one exemplary embodiment.

Figure 9:
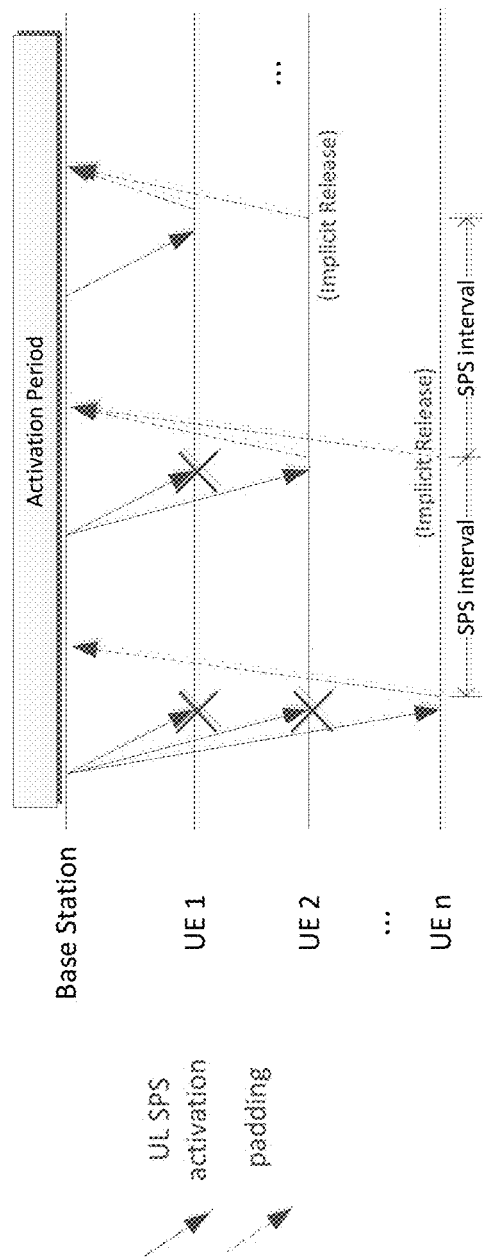
FIG. 9 is a diagram according to one exemplary embodiment.

For LTE SPS in UL, implicit release is mandatory. If the activation period mentioned above is needed, the UE which has been activated earlier may not have data for transmission for the first few SPS occasions, and resources for UL SPS may be implicitly released. FIG. 9 illustrates an example of LTE SPS implicit release according to one exemplary embodiment.

Based on above drawbacks, it seems unlikely to use LTE SPS to handle this case without any modification (e.g., disable implicit release). Therefore, more optimized mechanism should be pursued. To overcome the drawbacks of LTE SPS, the following improvements are contemplated and used:

To handle the same instruction transmitted to a set of UEs, multicast transmission is utilized for the same downlink instruction. Using multicast can reduce PDCCH resource and scheduling complexity.

Lower layer signaling is not used for SPS (de)activation. Instead, dedicated RRC signaling is used to indicate the time to start SPS transmission/reception. Every UE in the set can have the same understanding on when to start SPS transmission/reception, and there will be no additional UE power waste due to earlier SPS activation.

Figure 10:
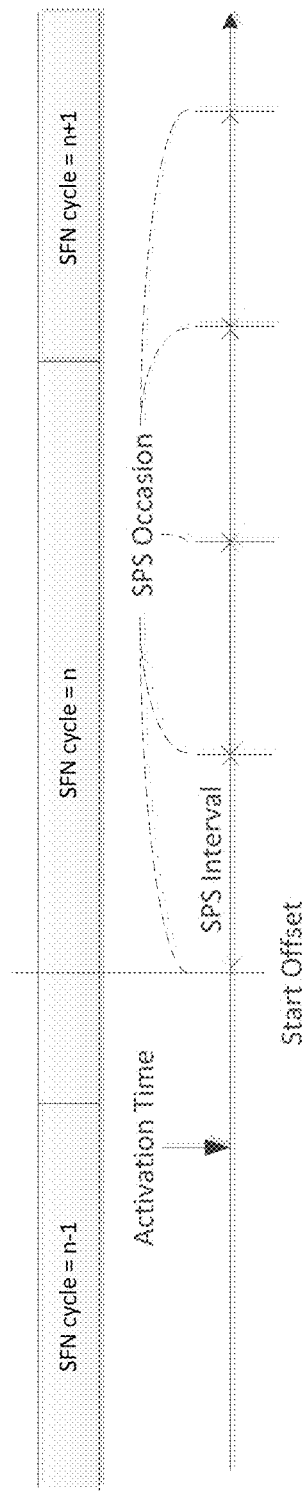
FIG. 10 is a diagram according to one exemplary embodiment.

The required UE dedicated configurations are listed below:

Group RNTI (Optional)
Used for scrambling of data, if needed.
DL & UL SPS Interval
DL SPS interval and UL SPS interval could be common or separate.
Time to Start DL Reception
To ensure every UE in the set to start DL reception at the same time, the time to start DL reception needs to be indicated. It can be represented by a start offset, activation time, or the combination of them. SPS occasions could be defined by a start offset and an SPS interval. SPS resources may occur at each SPS occasion once they are activated and an additional activation time could be used to indicate the time when the SPS resources will be activated. FIG. 10 illustrates an example of how to determine time to start DL reception by activation time and offset.

Alternatively, the activation time could be replaced by an activation command which may or may not include an activation time. Not including any activation time would mean to activate the SPS configuration immediately. The activation command is preferably a RRC (Radio Resource Control) message.

Alternatively, the UE could start to apply SPS resources (including at least a start-offset, periodicity, and radio resources) when upper layer, e.g., the application layer, informs the lower layer.

It is For Further Study (FFS) whether deactivation time used to stop DL reception is needed.

Time to Start UL Transmission
Time to start UL transmission may not be the same for every UE in the set (depending on resource scheduling). To indicate the UL timing, the signaling could be a delta value to the DL timing, or could be independent to DL timing, e.g., another activation time and start offset.

Resource Allocation for DL Reception & UL Transmission
The resource allocation indicates what resource is used for DL reception and UL transmission. MCS (Modulation and Coding Scheme) also needs to be indicated. It is assumed that the allocation does not change frequently. For DL reception, the resource is the same among the set of UEs. For UL transmission, each UE should have its own resource. It may also be configured via system information. However, this information does not seem necessary to repeatedly transmitted like system information does.

In order to decide AS (Access Stratum) configuration by BS, information from factory network (FN) to BS is necessary. There are several options for factory network to indicate the information to BS. It is possible that not all information is provided in the same way.

Figure 11:
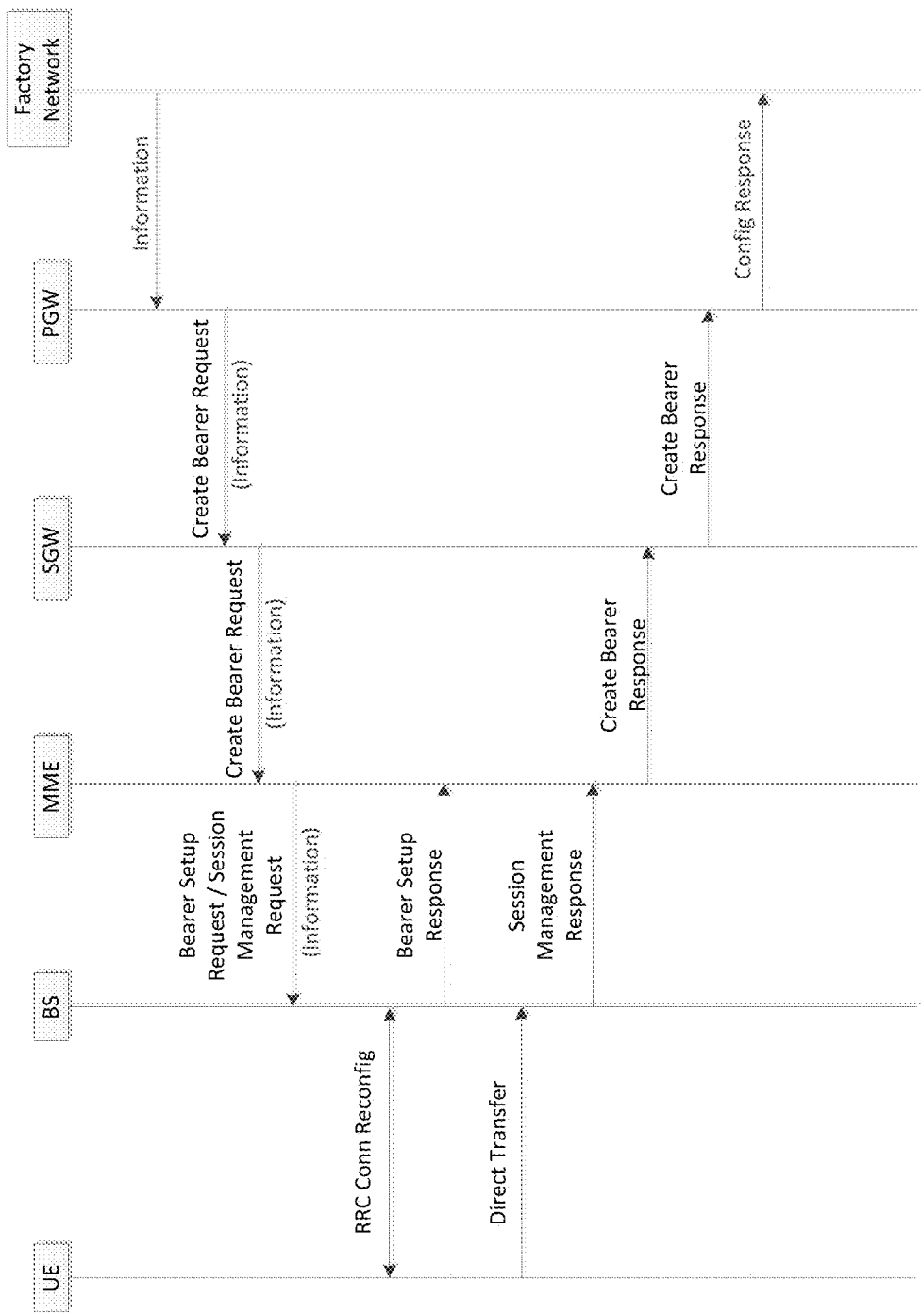
FIG. 11 is a diagram according to one exemplary embodiment.

Via Dedicated EPS Bearer Activation Procedure
Dedicated EPS bearer activation procedure is specified in Section 5.4.1 of 3GPP TS 23.401 v13.4.0. The procedure is triggered by PDN (Packet Data Network) GW (Gateway). In this procedure, the PDN GW sends a Create Bearer Request message, the content of which is then forwarded to BS. In LTE, this message includes IMSI (International Mobile Subscriber Identity), PTI (Precoding Type Indicator), EPS (Evolved Packet System) Bearer QoS (Quality of Service), TFT (Traffic Flow Template), S5/S8 TEID (Tunnel Endpoint Identifier), etc. For factory automation, this procedure could be used to provide BS necessary information to configure SPS resources to a UE. FIG. 11 illustrates an example of factory network configuration via dedicated EPS bearer activation according to one exemplary embodiment.

Figure 12:
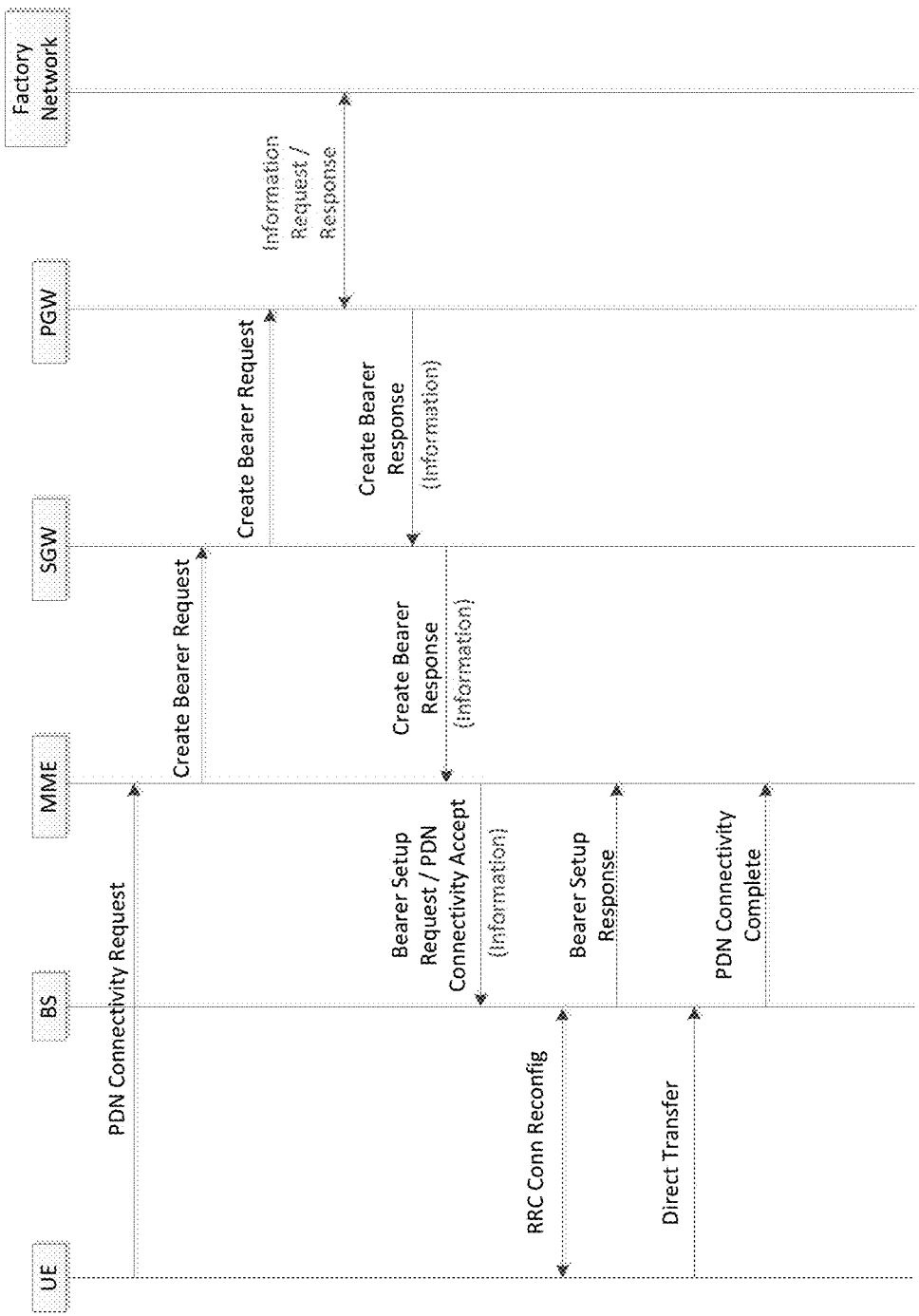
FIG. 12 is a diagram according to one exemplary embodiment.

Via UE Requested PDN Connectivity Procedure
UE requested PDN connectivity procedure is specified in Section 5.10.2 of 3GPP TS 23.401 v13.4.0. The procedure is triggered by a UE. When BS receives the necessary information from factory network, it can configure SPS resources to the UE in RRC Connection Reconfiguration procedure which configures default EPS bearer to the UE. FIG. 12 shows an example of factory network configuration via UE requested PDN connectivity procedure according to one exemplary embodiment.

Figure 13:
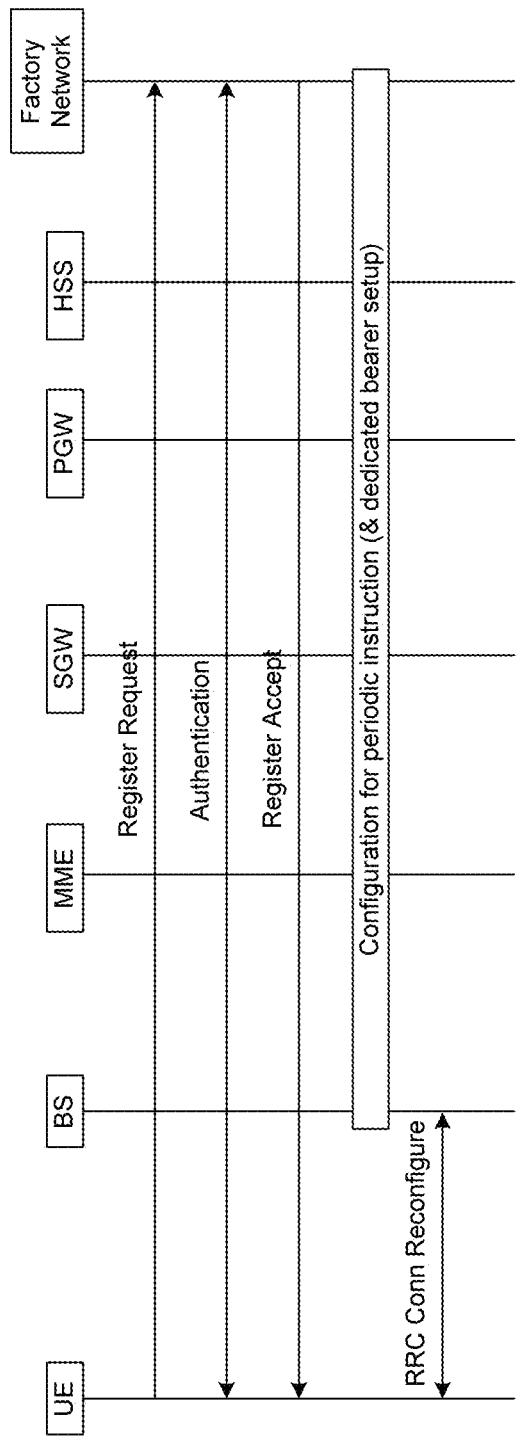
FIG. 13 is a diagram according to one exemplary embodiment.
Figure 14:
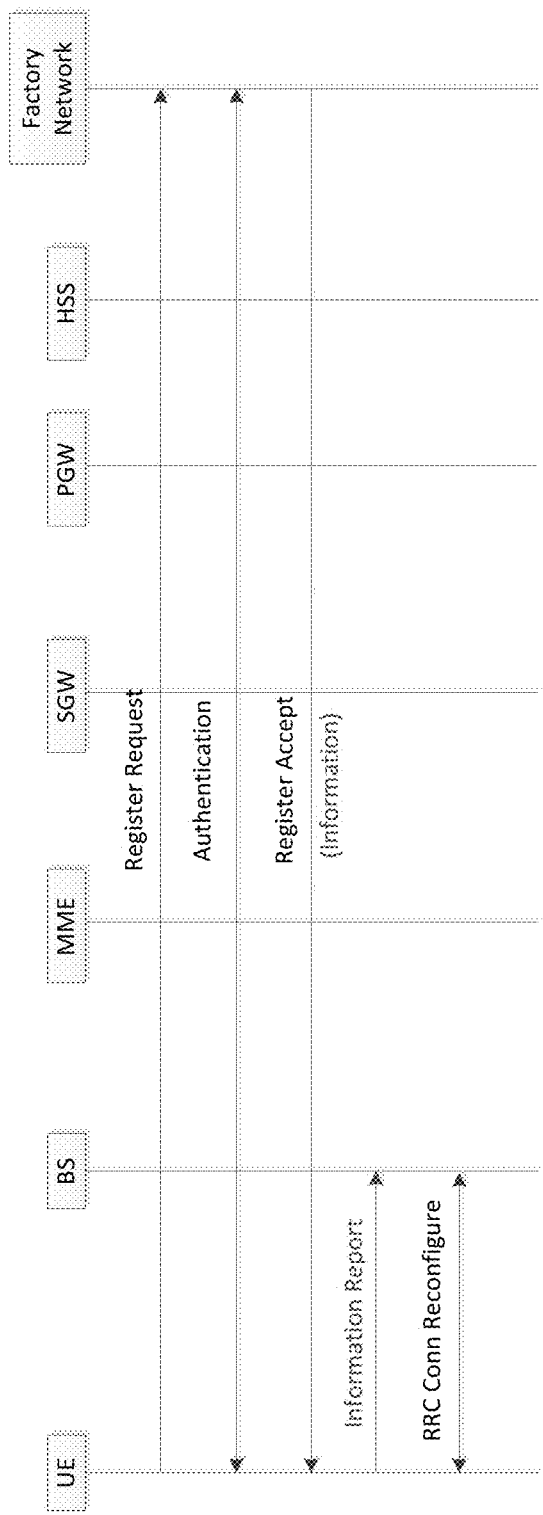
FIG. 14 is a diagram according to one exemplary embodiment.

Via Registration to Factory Network
The registration procedure is shown in FIG. 13 according to one exemplary embodiment. When a UE is registered to a factory network, the factory network could provide necessary information to the UE. Then the UE reports the information to BS. Alternatively, the factory network can provide the information to BS via another signaling. The BS can configure the UE based on the information. FIG. 14 illustrates an example of factory network configuration via registration to factory network.

The necessary information from factory network are listed below:

The Set of UEs to Receive an Instruction
Upon receiving an instruction from factory network, BS needs to know the instruction should be sent to which set of UEs. It will be too late (cycle time requirement cannot be met) to configure the set of UEs when BS receives the instruction.

A group ID associated with UE(s) should be indicated to the BS. The UE may be represented by its device ID or temporary ID. And the BS associates the UE with a group for the group ID by mapping the UE ID (e.g. device ID) and group ID to a group RNTI. In other words, BS needs to maintain a mapping between a group ID and a group RNTI for a set of UEs.

And the group ID may be provided together with each instruction. So BS can understand which set of UEs that an instruction is transmitted to.

Possible options for group ID could be a specific ID, an IP address, a port number or a bearer ID for the group.

Inter-arrival Time of Instructions
This information can assist BS to decide SPS interval.

Expression of Cycle Time Limitation
This information can assist BS to do the scheduling. DL part and UL part should be separately indicated, such as $D_{c,n}$ and $D_{a,n}$. The cycle time requirement may also be represented by QoS classes, such as QCI (QoS Class Identifier).

Time to Start the Instruction Transmission

This information can assist BS to decide the time to start DL reception for UE(s), such as activation time, start offset. If the UE decides to apply SPS resource based on application layer signaling from factory network, BS does not need to signal the activation time to the UE. However, BS still needs to know the time to start the instruction transmission from factory network based on the methods mentioned above in order to reserve SPS resource and transmit the instruction at the correct time.

Size of the Instruction/Size of the Response

This information can assist BS to do the scheduling. Size of response may not be the same for every UE.

Moreover, considering short cycle time and high reliability requirement, we further discuss how to achieve reliable response within the short cycle time.

Reliable periodic transmission—The discussion for reliable periodic transmission aims to develop a mechanism to increase reliability of periodic transmissions from controller. Necessary parameters provided to UEs should be considered. The solutions should at least consider the following points:

The instruction shall be delivered within $D_{c,n}$.

Diversity techniques could be used.

Figure 15:
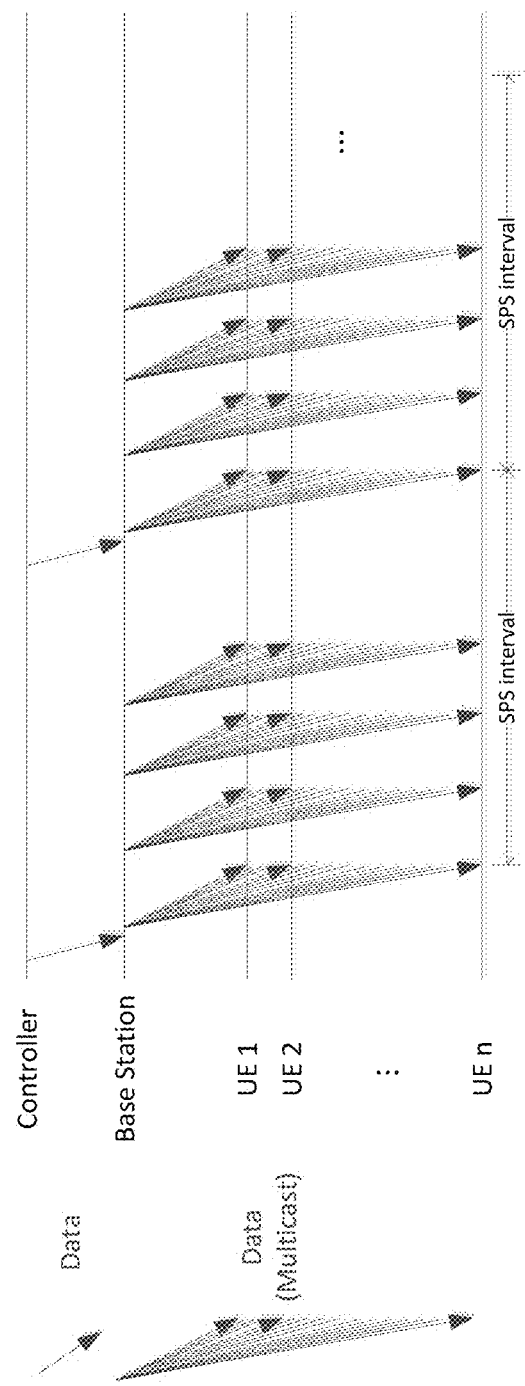
FIG. 15 is a diagram according to one exemplary embodiment.

Solution 1 (Blind repetition)—Transmission bundling is used but there is no HARQ feedback in this solution. There can be most transmission opportunity (within a fixed period of time, e.g. $D_{c,n}$) since retransmission doesn't need to wait for HARQ feedback. Besides, for the UE receiving the instruction successfully earlier, it can skip the rest of the retransmission so that there will be no extra UE power waste. FIG. 15 shows an example of blind repetition according to one exemplary embodiment. The required configurations include the DL number of repetitions.

Solution 2 (1 feedback for 1 bundle)—Transmission bundling and HARQ feedback are both used in this solution. There can be less transmission opportunity (within a fixed period of time, such as $D_{c,n}$) compare to Solution 1 shown in FIG. 15. For HARQ (Hybrid Automatic Repeat Request) feedback, only NACK (Negative Acknowledgement) needs to be transmitted (due to multicast transmission). If base station did not receive any NACK, base station does not need to perform retransmission, and DL resources can be saved. However, if base station receives a NACK, base station needs to perform retransmission and resources of retransmissions may be adaptive (such as a lower layer signaling is along with a retransmission) or non-adaptive.

And if retransmission is non-adaptive, timing of retransmissions would be fixed. Even if retransmission is adaptive, fixing the timing of retransmission may also beneficial to maximize the number of retransmission opportunity. UEs only need to wake up at the timing of retransmissions if the instruction has not been decoded successfully yet.

Figure 16:
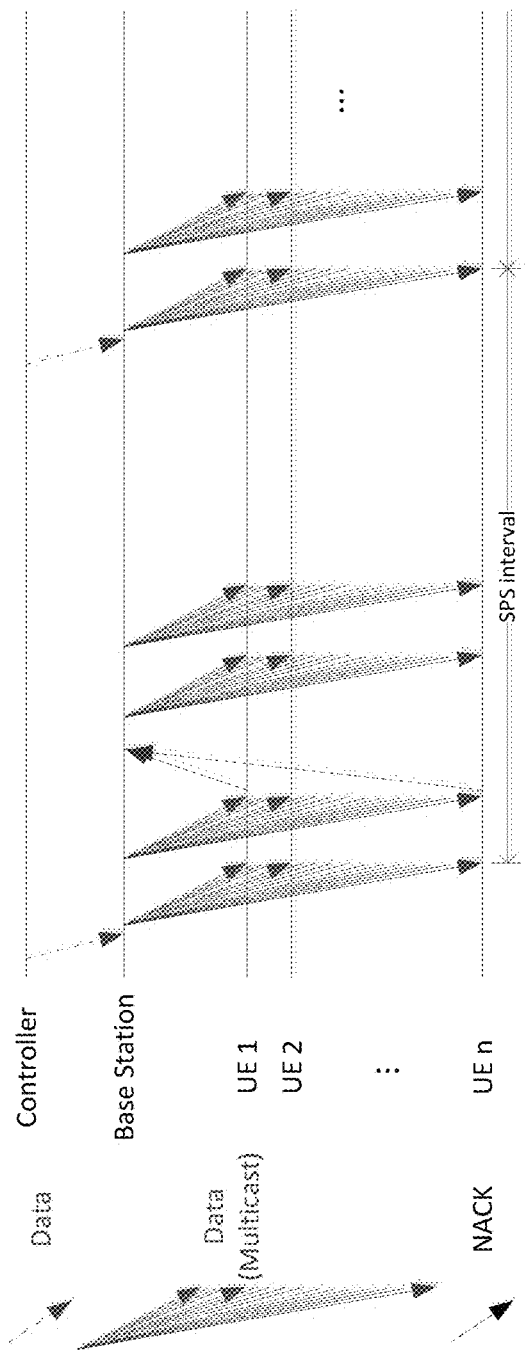
FIG. 16 is a diagram according to one exemplary embodiment.

Whether HARQ feedback is needed depends on how many times of transmission is allowed/needed in $D_{c,n}$. If latency requirement can be fulfilled, HARQ feedback is beneficial. Besides, HARQ feedback bundling could also be considered. Whether HARQ feedback is needed depends on delivery probability of a single transmission. FIG. 16 illustrates an example of 1 feedback for 1 transmission for DL instructions according to one exemplary embodiment.

The required configurations include:

DL number of repetitions

Resource allocation for HARQ feedback of DL reception—The resource allocation indicates what resource is used in what time (explicitly or implicitly). The resource could be the same among the set of UEs, and ACK does not need to be transmitted.

Maximum number of DL retransmissions—UEs only need to wake up to receive transmission(s) if the instruction has not been decoded successfully and the maximum number of DL retransmission has not been reached yet.

Solution 3 (1 feedback for 1 transmission)—Transmission bundling is not used but HARQ feedback is used in this solution. There can be even less transmission opportunity (within a fixed period of time, e.g. $D_{c,n}$) compare to Solution 2 shown in FIG. 16. For HARQ feedback, only NACK needs to be transmitted (due to multicast transmission). If base station did not receive any NACK, base station does not need to perform retransmission and DL resources can be saved. However, if base station receives a NACK, base station needs to perform retransmission and resources of retransmissions may be adaptive (such as a lower layer signaling is along with a retransmission) or non-adaptive.

And if retransmission is non-adaptive, timing of retransmissions would be fixed. Even if retransmission is adaptive, fixing the timing of retransmission may also beneficial to maximize the number of retransmission opportunity. UEs only need to wake up at the timing of retransmissions if the instruction has not been decoded successfully yet.

Figure 17:
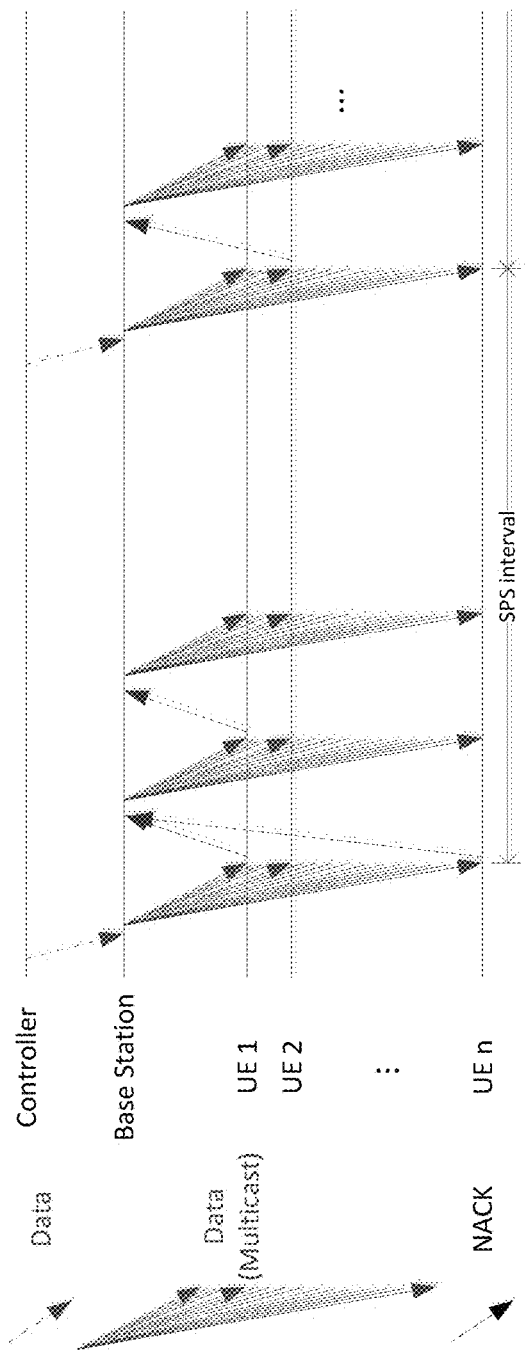
FIG. 17 is a diagram according to one exemplary embodiment.

Whether HARQ feedback is needed depends on how many times of transmission is allowed/needed in $D_{c,n}$. If latency requirement can be fulfilled, HARQ feedback would be beneficial. Besides, HARQ feedback bundling could also be considered. Whether it is needed depends on delivery probability of a single transmission. FIG. 17 shows an example of 1 feedback for 1 transmission for DL instruction according to one exemplary embodiment.

The required configurations include:

Resource allocation for HARQ feedback of DL reception—The resource allocation indicates what resource is used in what time (explicitly or implicitly). The resource could be the same among the set of UEs, and ACK does not need to be transmitted.

Maximum number of DL retransmissions—UEs only need to wake up to receive transmission(s) if the instruction has not been decoded successfully and the maximum number of DL retransmission has not been reached yet.

Reliable response—The discussion for reliable response aims to develop a mechanism to increase reliability of responses from UEs. Necessary parameters provided to UEs should be considered. The solutions should at least consider the following points:

UL response shall be delivered within $D_{a,n}$

Diversity techniques could be used.

Every UE should have its own response.

Figure 18:
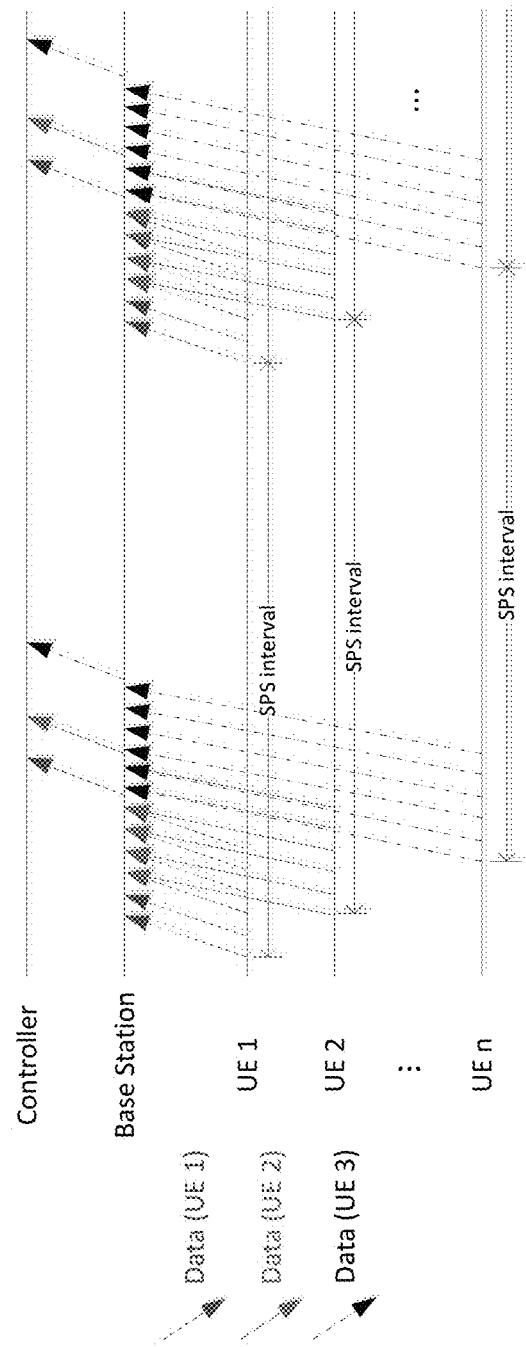
FIG. 18 is a diagram according to one exemplary embodiment.
Figure 19:
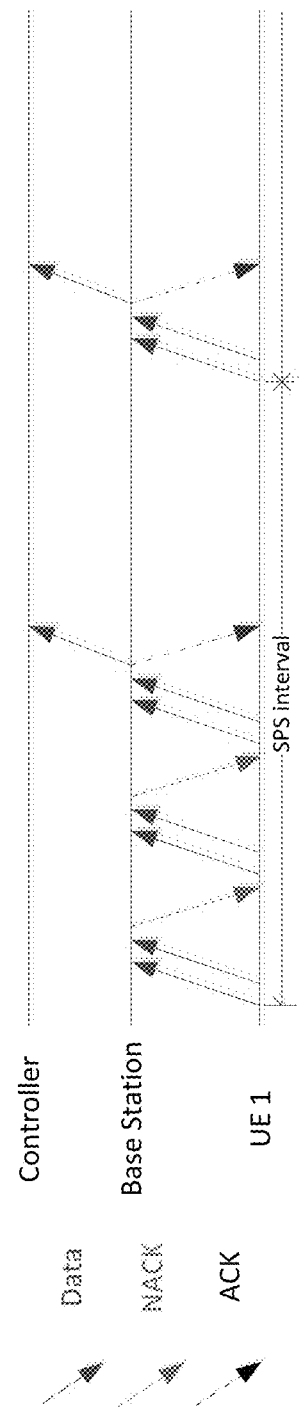
FIG. 19 is a diagram according to one exemplary embodiment.

Solution 1 (Blind repetition)—Transmission bundling is used but there is no HARQ feedback in this solution. Without HARQ feedback, the UE cannot know whether the transmission is successful or not. In order to ensure reliability, there may be more UL transmissions than needed. Redundant transmission causes UE power waste. FIG. 18 shows an example of blind repetition for UL response according to one exemplary embodiment. The required configurations include the UL number of repetitions.

Solution 2 (1 feedback for 1 bundle)—Transmission bundling and HARQ feedback are both used in this solution. Transmission bundling increases the transmission opportunity (within a fixed period of time, such as $D_{a,n}$). HARQ feedback enables UE to know when to stop retransmission. Since each UE may require different number of retransmissions, the UE power consumption can be controlled based on HARQ feedback. Besides, HARQ feedback bundling could also be considered. Whether HARQ feedback bundling is needed depends on delivery probability of a single transmission. FIG. 14 illustrates an example of 1 feedback for 1 bundle involving only one UE according to one exemplary embodiment.

Figure 20:
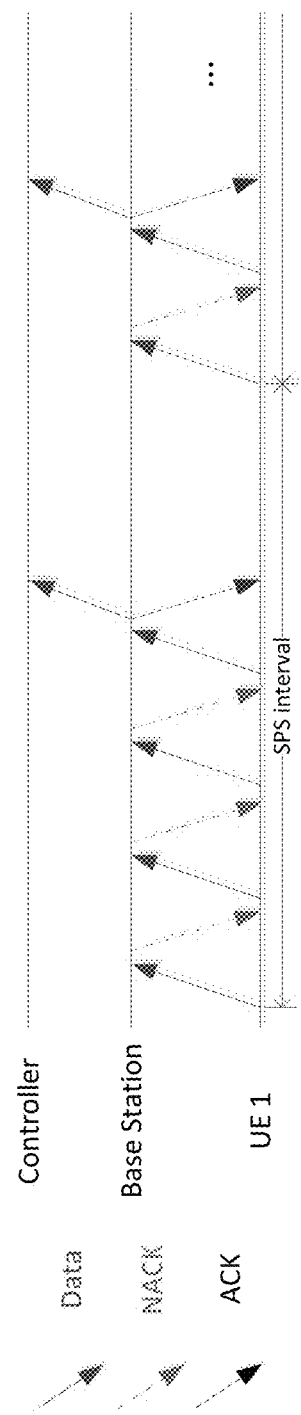
FIG. 20 is a diagram according to one exemplary embodiment.

The required configurations include:
UL number of repetitions
Maximum number of UL retransmissions Solution 3 (1 feedback for 1 transmission)—Transmission bundling is not used but HARQ feedback is used in this solution. Whether transmission bundling is necessary depends on how many times of transmission is allowed or needed in $D_{a,n}$. HARQ feedback enables UE to know when to stop retransmission. Since each UE may require different number of retransmissions, the UE power consumption can be controlled based on HARQ feedback. Besides, HARQ feedback bundling could also be considered. Whether HARQ feedback bundling is needed depends on delivery probability of a single transmission. FIG. 20 shows an example of 1 feedback for 1 transmission UL response involving only one UE according to one exemplary embodiment. The required configurations include the maximum number of UL retransmissions.

To summarize above analysis and assumption, it is assumed that next generation mobile communication system will need to apply persistent scheduling mechanism to schedule transmissions of closed loop control for preventing tremendous signaling overhead. Furthermore, the size of persistently scheduled resource will take message size of closed loop control service into account for preventing unnecessary resource waste. In addition, it is necessary to increase robustness of each new transmission and/or to blindly retransmit every data for achieving high robustness requirement.

In general, it is possible that the devices will have not only closed loop control service but also different kinds of services, and will need different corresponding logical channels (such as SRB (Signaling Radio Bearer), DRB (Data Radio Bearer)) for differentiation services. Regarding the services different from closed loop control, the data coming may not be predictable by the base station. Based on above assumptions, if there is unexpected data becoming available, the UE may trigger a BSR (Buffer Status Report) for requesting uplink resource following legacy design (as discussed in 3GPP TS 36.321). Since the BSR normally has higher priority than normal data, if there is configured uplink resource provided by the persistent scheduling mechanism, the UE will first include the BSR into a transport block (TB) regardless any pending data. Besides, if the unexpected data has higher priority than data of closed loop control, the TB will first include the unexpected data instead of periodic data and cause the similar result as triggered BSR.

Figure 21:
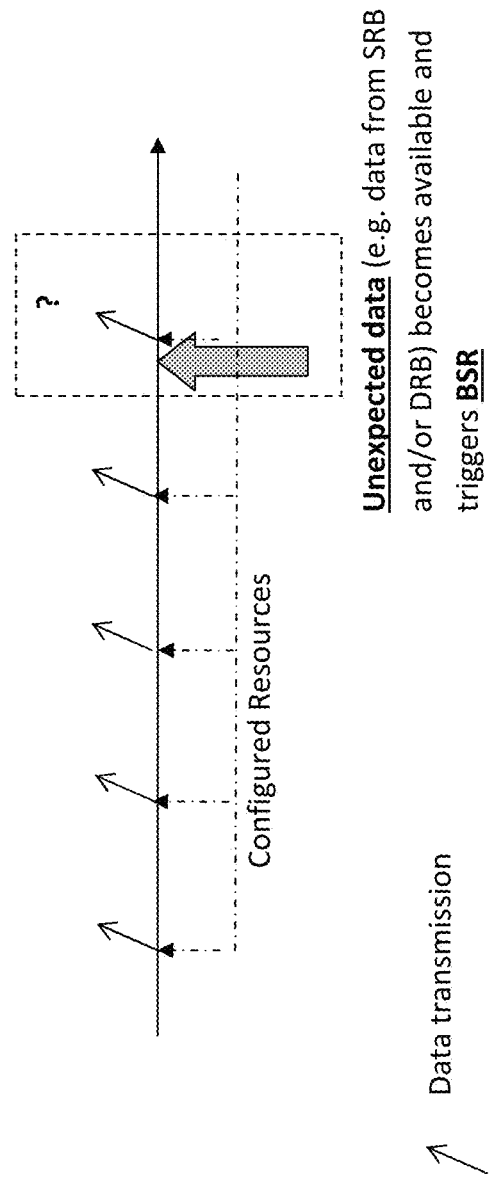
FIG. 21 is a diagram according to one exemplary embodiment.

In such case, because the size of persistently scheduled resource may not take such unpredictable BSR and/or data into account, the data of closed loop control will be separated into multiple transmissions. As a result, the short cycle time requirement of closed loop control service may not be achievable. A possible scenario is shown in FIG. 21 and the issue is for how to decide the contents of the transmission with question mark.

For achieving short cycle requirement, there are two possible solutions:

Solution 1—In general, this solution involves assigning configured resource of persistent scheduling for dedicatedly serving the logical channel of the periodic data. More specifically, regardless prioritization rule for dynamic scheduling, any logical channels except the logical channel of the periodic data should not use the configured resource for transmission. Preferably, any control elements should also not use the configured resource for transmission.

On the other hand, a special case for Solution 1 should be considered. Regarding the special case, if the unexpected data mentioned above is related to the periodic data in service aspect, the unexpected data may have the same or tighter service requirement compared with the periodic data. In such case, it would be better that network has flexibility for assigning the configured resource of persistent scheduling to serve not only the logical channel of the periodic data but also the logical channel(s) of the unexpected data for achieving service requirements. Furthermore, any other logical channels having available data cannot use the configured resource for transmission as previous mentioned. In one embodiment, no control element can use the configured resource for transmission.

Moreover, if the network provides a dynamically scheduled resource to the UE in a TTI (Transmission Time Interval) having no configured resource, the UE will not use the dynamically scheduled resource to transmit the periodic data which has the dedicatedly configured resource. In one embodiment, the unexpected data can be transmitted by using the dynamically scheduled resource even when the unexpected data has the dedicatedly configured resource.

Solution 2—In general, this solution involves prioritizing the logical channel of the periodic data over control elements and any other logical channels when using the configured resource of persistent scheduling. Following the similar concept of the special case mentioned in Solution 1, if there are logical channels related to the logical channel of the periodic data in service aspect, the network could configured those logical channels has the same or higher priority compared with the logical channel of the periodic data regardless whether the traffic flows of those logical channels are periodic or aperiodic. In this case, there will be multiple logical channels having higher priority than control elements and any other logical channels when the UE is using a configured resource for transmission.

In one embodiment, when the UE is using a dynamically scheduled resource for transmission, the prioritization rule for control elements and those prioritized logical channels may change. For example, the logical channel of the periodic data may have lower priority compared with control elements when using a dynamically scheduled resource. Another example could be that the logical channel of the periodic data has lower priority compared with control elements when using a dynamically scheduled resource, but the logical channel(s) of the unexpected data is still prioritized over control elements when using the dynamically scheduled resource.

In one embodiment, the logical channels, which being prioritized or dedicatedly served, are data radio bearers. Furthermore, at least one of the logical channels, which being prioritized or dedicatedly served, is carrying data generated aperiodically. In addition, the logical channels discussed above are for the same base station. Also, the logical channels discussed above are configured by the same base station. Furthermore, the logical channels discussed above are used to forwarding transmissions to the same base station. The data radio bearer is a radio bearer for forwarding user data. The signaling radio bearer is a radio bearer for forwarding control data (e.g. RRC message, NAS message).

In one embodiment, a report could be the control element, including control information in medium access control (MAC) layer, but is not limited thereto. Furthermore, the control elements mentioned above could include BSR and/or PHR.

In one embodiment, the dynamically scheduled resource is an uplink resource used to transmit data (such as user data or control data). Furthermore, the dynamically scheduled resource is an uplink grant (such as one new transmission opportunity, etc.). In addition, the configured resource of persistent scheduling is provided in RRC configuration. Alternatively, the configured resource of persistent scheduling is provided by a RRC configuration and an activation signal (such as control signal in physical layer, control signal in MAC layer, etc.) from BS. Furthermore, the persistent scheduling mechanism is a method for periodical providing resources for data transmission to a UE without repeatedly sending control signal for each resource.

Figure 22:
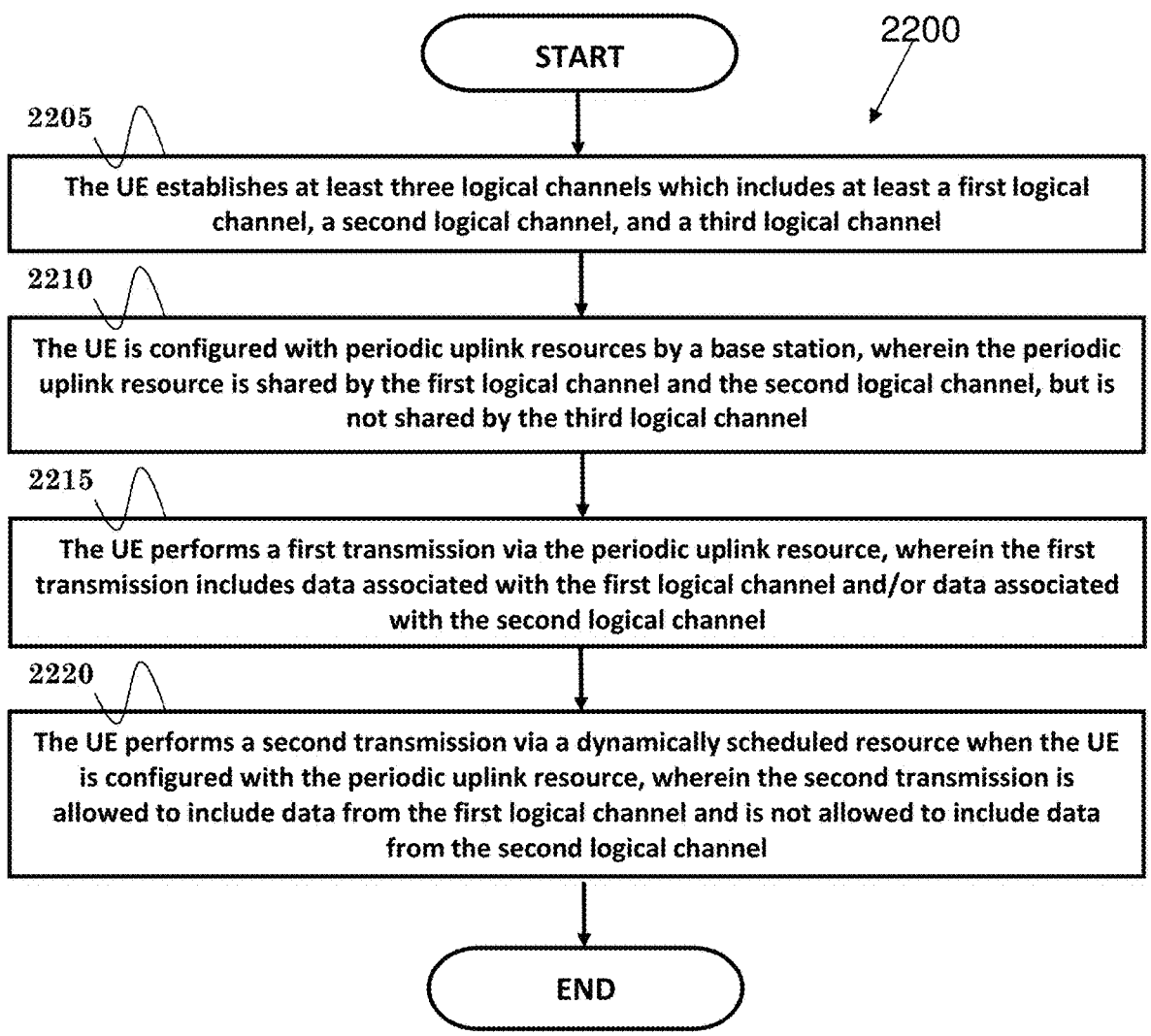
FIG. 22 is a flow chart according to one exemplary embodiment.

FIG. 22 is a flow chart 2200 according to one exemplary embodiment from the perspective of a UE. In step 2205, the UE establishes at least three logical channels which includes at least a first logical channel, a second logical channel, and a third logical channel. In step 2210, the UE is configured with periodic uplink resource by a base station, wherein the periodic uplink resource is shared by the first logical channel and the second logical channel, but is not shared by the third logical channel. Furthermore, the first logical channel, the second logical channel and third logical channel could be logical channels for uplink and/or for the same base station. In one embodiment, priority of the first logical channel is higher than priority of the second channel.

In step 2215, the UE performs a first transmission via the periodic uplink resource, wherein the first transmission includes data associated with the first logical channel and/or data associated with the second logical channel. In one embodiment, a report that includes control information of the UE is not allowed to be transmitted via the periodic uplink resource. Furthermore, the periodic uplink resource and channel(s) to utilize the periodic uplink resource could be configured by a same signaling.

In one embodiment, the first logical channel carries data which is generated aperiodically, and the second logical channel carries data which is generated periodically. Furthermore, the third logical channel is not allowed to be configured to utilize the periodic uplink resource if priority of the third channel is lower than priority of the second channel.

In one embodiment, the control information of the UE is related to buffer status and/or power headroom. In one embodiment, data coming from the first logical channel is not triggered by the base station. Furthermore, the first logical channel and the second logical channel could be data radio bearers. In addition, the third logical channel could be a SRB or a DRB.

In step 2220, the UE performs a second transmission via a dynamically scheduled resource when the UE is configured with the periodic uplink resource, wherein the second transmission is allowed to include data from the first logical channel and is not allowed to include data from the second logical channel.

Referring back to FIGS. 3 and 4, in one exemplary embodiment of a UE, the device 300 includes a program code 312 stored in the memory 310 program code 312. The CPU 308 could execute program code 312 to enable the UE (i) to establish at least three logical channels which includes at least a first logical channel, a second logical channel, and a third logical channel, (ii) to be configured with periodic uplink resource by a base station, wherein the periodic uplink resource is shared by the first logical channel and the second logical channel, but is not shared by the third logical channel, and (iii) to perform a first transmission via the periodic uplink resource, wherein the first transmission includes data associated with the first logical channel and/or data associated with the second logical channel.

In one embodiment, the CPU 308 could execute program code 312 to enable the UE to perform a second transmission via a dynamically scheduled resource when the UE is configured with the periodic uplink resource, wherein the second transmission is allowed to include data from the first logical channel and is not allowed to include data from the second logical channel.

Figure 23:
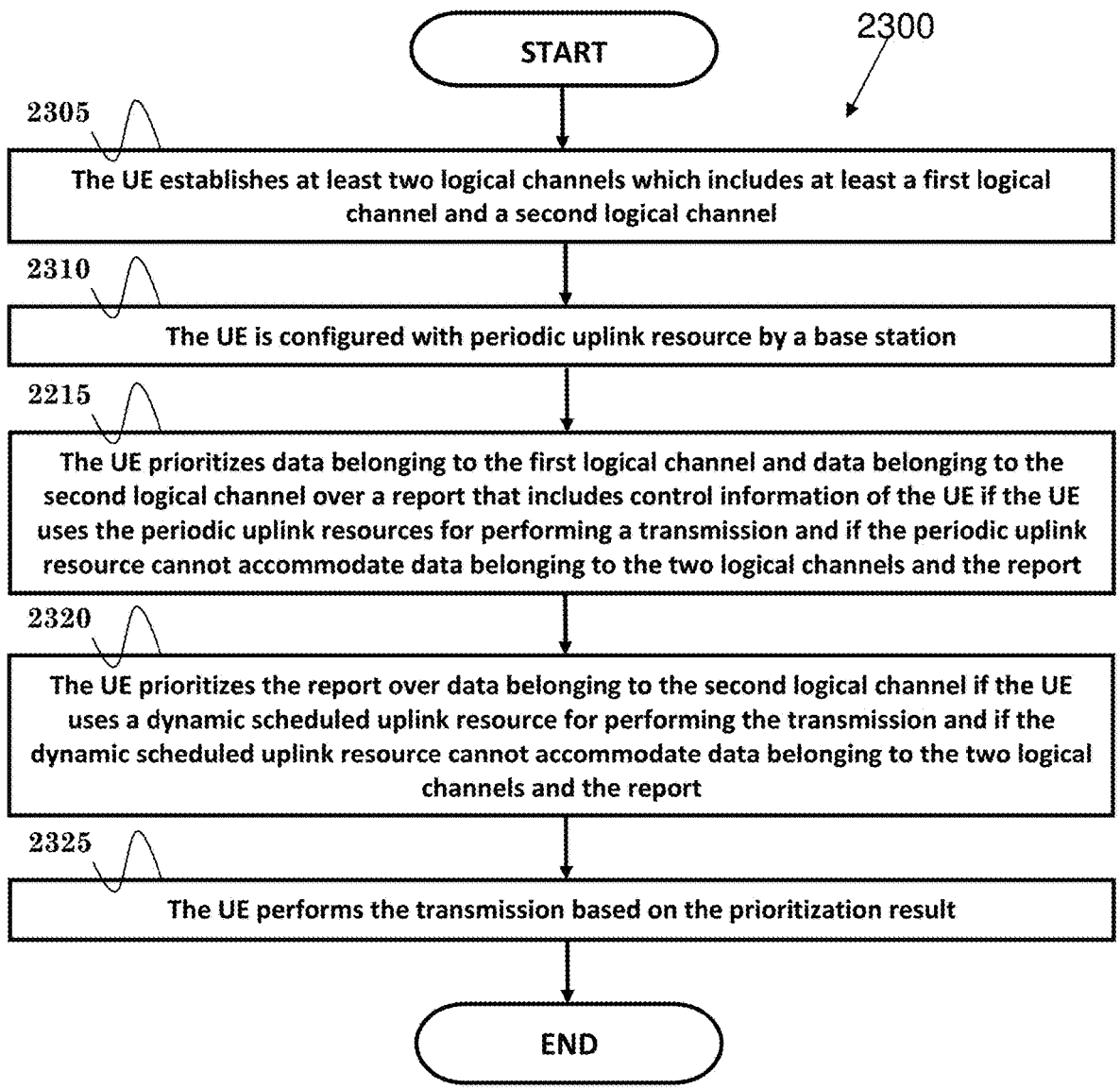
FIG. 23 is a flow chart according to one exemplary embodiment.

FIG. 23 is a flow chart 2300 according to one exemplary embodiment from the perspective of a UE. In step 2305, the UE establishes at least two logical channels which includes at least a first logical channel and a second logical channel. In step 2310, the UE is configured with periodic uplink resource by a base station. Furthermore, the first logical channel, and the second logical channel could be logical channels for uplink and/or for the same base station. In one embodiment, priority of the first logical channel is higher than priority of the second channel.

In step 2315, the UE prioritizes data belonging to the first logical channel and data belonging to the second logical channel over a report that includes control information of the UE if the UE uses the periodic uplink resources for performing a transmission and the periodic uplink resource cannot accommodate data belonging to the two logical channels and the report. In one embodiment, the control information of the UE is related to buffer status and/or power headroom.

In one embodiment, the first logical channel carries data which is generated aperiodically, and the second logical channel carries data which is generated periodically.

In one embodiment, data coming from the first logical channel is not triggered by the base station. Furthermore, the first logical channel and the second logical channel could be data radio bearers.

In step 2320, the UE prioritizes the report over data belonging to the second logical channel if the UE uses a dynamic scheduled uplink resource for performing the transmission and the dynamic scheduled uplink resource cannot accommodate data belonging to the two logical channels and the report. In step 2325, the UE performs the transmission based on the prioritization result.

Referring back to FIGS. 3 and 4, in one exemplary embodiment of a UE, the device 300 includes a program code 312 stored in the memory 310 program code 312. The CPU 308 could execute program code 312 to enable the UE (i) to establish at least two logical channels which includes at least a first logical channel and a second logical channel, (ii) to be configured with periodic uplink resource by a base station, (iii) to prioritize data belonging to the first logical channel and data belonging to the second logical channel over a report that includes control information of the UE if the UE uses the periodic uplink resources for performing a transmission and if the periodic uplink resource cannot accommodate data belonging to the two logical channels and the report, (iv) to prioritize the report over data belonging to the second logical channel if the UE uses a dynamic scheduled uplink resources for performing the transmission and if the dynamic scheduled uplink resource cannot accommodate data belonging to the two logical channels and the report, and (v) to perform the transmission based on the prioritization result.

In one embodiment, the CPU 308 could execute program code 312 to enable the UE to prioritize data belonging to the first logical channel over the report if the UE uses the dynamic scheduled uplink resources for performing the transmission and if the dynamic scheduled uplink resource cannot accommodate data belonging to the two logical channels and the report.

Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), comprising:
  the UE establishes at least three logical channels which includes at least a first logical channel, a second logical channel, and a third logical channel;
  the UE is configured with periodic uplink resource by a base station, wherein the periodic uplink resource is associated with the first logical channel and the second logical channel, but is not shared by the third logical channel;
  the UE performs a first transmission via the periodic uplink resource, wherein the first transmission includes data from the first logical channel and/or data from the second logical channel; and the UE performs a second transmission via dynamically scheduled resource when the UE is configured with the periodic uplink resource, wherein the second transmission is not allowed to include data from the second logical channel.

2. The method of claim 1, wherein a report that includes control information of the UE is not allowed to be transmitted via the periodic uplink resources.

3. The method of claim 1, wherein the first logical channel carries data which is generated aperiodically, and the second logical channel carries data which is generated periodically.

4. The method of claim 1, wherein priority of the first logical channel is higher than priority of the second channel.

5. The method of claim 1, wherein the control information of the UE is related to buffer status and/or power headroom.

6. The method of claim 1, wherein the first logical channel and the second logical channel are data radio bearers (DRB).

7. The method of claim 1, wherein the dynamically scheduled resource is not associated with the second logical channel.

8. The method of claim 1, further comprising:

the UE performs the second transmission via the dynamically scheduled resource when the UE is configured with the periodic uplink resource, wherein the second transmission is allowed to include data from the first logical channel.

9. The method of claim 1, wherein the first logical channel, the second logical channel and third logical channel are logical channels for uplink and/or for a same base station.

10. A User Equipment (UE), comprising:
a control circuit;
a processor installed in the control circuit; and
a memory installed in the control circuit and operatively coupled to the processor;
wherein the processor is configured to execute a program code stored in the memory to:
establish at least three logical channels which includes at least a first logical channel, a second logical channel, and a third logical channel;
be configured with periodic uplink resource by a base station, wherein the periodic uplink resource is associated with the first logical channel and the second logical channel, but is not associated with the third logical channel;
perform a first transmission via the periodic uplink resource, wherein the first transmission includes data from the first logical channel and/or data from the second logical channel; and
perform a second transmission via a dynamically scheduled resource when the UE is configured with the periodic uplink resource, wherein the second transmission is not allowed to include data from the second logical channel.

11. The UE of claim 10, wherein the dynamically scheduled resource is not associated with the second logical channel.

12. The UE of claim 10, wherein the processor is further configured to execute a program code stored in the memory to:
perform the second transmission via the dynamically scheduled resource when the UE is configured with the periodic uplink resource, wherein the second transmission is allowed to include data from the first logical channel.

13. The method of claim 1, wherein the first transmission is not allowed to include data from the third logical channel.

14. The UE of claim 10, wherein a report that includes control information of the UE is not allowed to be transmitted via the periodic uplink resources.

15. The UE of claim 10, wherein the first logical channel carries data which is generated aperiodically, and the second logical channel carries data which is generated periodically.

16. The UE of claim 10, wherein priority of the first logical channel is higher than priority of the second channel.

17. The UE of claim 10, wherein the control information of the UE is related to buffer status and/or power headroom.

18. The UE of claim 10, wherein the first logical channel and the second logical channel are data radio bearers (DRB).

19. The UE of claim 10, wherein the first logical channel, the second logical channel and third logical channel are logical channels for uplink and/or for a same base station.

20. The UE of claim 10, wherein the first transmission is not allowed to include data from the third logical channel.

* * * * *